United States Patent
Onodera

(10) Patent No.: US 6,995,869 B2
(45) Date of Patent: Feb. 7, 2006

(54) IMAGE PROCESSING DEVICE AND METHOD FOR GENERATING CHANGES IN THE LIGHT AND SHADE PATTERN OF AN IMAGE

(75) Inventor: Takahiro Onodera, Saitama (JP)

(73) Assignees: Konami Corporation, Tokyo (JP); Konami Computer Entertainment Tokyo, Inc., Tokyo (JP)

( * ) Notice: Subject to any disclaimer, the term of this patent is extended or adjusted under 35 U.S.C. 154(b) by 840 days.

(21) Appl. No.: 09/969,586

(22) Filed: Oct. 4, 2001

(65) Prior Publication Data

US 2002/0041385 A1    Apr. 11, 2002

(30) Foreign Application Priority Data

Oct. 5, 2000    (JP)    ............................ 2000-306610

(51) Int. Cl.
*B41J 1/00*    (2006.01)
*G06F 15/00*    (2006.01)
*G09G 5/02*    (2006.01)

(52) U.S. Cl. ........................................ 358/1.9; 345/589
(58) Field of Classification Search ................ 358/1.9, 358/1.6; 345/344–346, 589, 592–593, 692, 345/634, 637, 629; 395/133, 135
See application file for complete search history.

(56) References Cited

U.S. PATENT DOCUMENTS 6,072,489 A    6/2000    Gough et al.
6,429,874 B1 *    8/2002    Miura ........................ 345/589

FOREIGN PATENT DOCUMENTS

EP    1 030 271 A2    8/2000

OTHER PUBLICATIONS

Foley et al, "Simple Animation Effects and Image Compositing", *Addison Wesley Publishing*, pp. 181, paragraph 2, 1997—XP002256747.
Shoup, "Color Table Animation", *Computer Graphics, NY*, vol. 2, No. 13, pp. 8-13, Aug. 1, 1979, XP002075128.

* cited by examiner

*Primary Examiner*—Kimberly Williams
*Assistant Examiner*—Charlotte M. Baker
(74) *Attorney, Agent, or Firm*—Sughrue Mion, PLLC

(57)    ABSTRACT

In order to represent, as a video, changes in the light-and-shade patterns of an image with a reduced demand for storage capacity and a relatively small amount of preparation, light-and-shade pattern data representing the light-and-shade pattern to be added to an original image and constructed by assigning a palette number to each image region obtained by dividing the original image is prepared. A plurality of palette data constructed by assigning color information having brightness difference to each palette number are generated, the plurality of palette data being different from each other. A plurality of light-and-shade images each based on the light-and-shade pattern data and one of the palette data generated at the palette data generating step are translucently blended, in sequence, into the original image.

12 Claims, 4 Drawing Sheets

CIRCULATE

IMAGE PROCESSING DEVICE AND METHOD FOR GENERATING CHANGES IN THE LIGHT AND SHADE PATTERN OF AN IMAGE

BACKGROUND OF THE INVENTION

1. Field of the Invention

The present invention relates to an image processing device, image processing method, and information recording medium, and in particular, to technology for displaying an original image having light-and-shade pattern change with small processing load.

2. Description of the Related Art

When changes in the light-and-shade pattern of an image are represented in a video, such as, for example, a waving national flag or a moving water surface, a so-called animation method has been employed wherein a plurality of images each representing the course of change are pre-provided in a storage device and sequentially displayed.

However, pre-provision of a plurality of images requires a large storage capacity.

SUMMARY OF THE INVENTION

The present invention was conceived to solve the above-mentioned problem, and one object of the present invention is to provide an image processing device, an image processing method, and an information recording medium which can easily represent, by video, the changes in the light-and-shade pattern of an image and which lowers the necessary storage capacity.

In order to achieve at least the object mentioned above, according to one aspect of the present invention, there is provided an image processing device comprising: original image data obtaining means for obtaining original image data representing an original image; light-and-shade pattern data obtaining means for obtaining light-and-shade pattern data representing the light-and-shade pattern to be added to the original image and constructed by assigning a palette number to each image region obtained by dividing the original image; palette data generating means for generating a plurality of palette data each constructed by assigning color information to each palette number, said color information having different brightness from each other, the plurality of palette data being different from each other; translucent blending means for translucently blending, in sequence, a plurality of light-and-shade images each based on the light-and-shade pattern data and one of the palette data generated by the palette data generating means, into the original image based on the original image data; and image displaying means for sequentially displaying images obtained by the translucent synthesis.

According to another aspect of the present invention, there is provided an image processing method, comprising: an original image data obtaining step for obtaining original image data representing an original image; a light-and-shade pattern data obtaining step for obtaining light-and-shade pattern data representing the light-and-shade pattern to be added to the original image and constructed by assigning a palette number to each image region obtained by dividing the original image; a palette data generating step for generating a plurality of palette data each constructed by assigning color information to each palette number, said color information having different brightness from each other, the plurality of palette data being different from each other; a translucent blending step for translucently blending, in sequence, a plurality of light-and-shade images each based on the light-and-shade pattern data and one of the palette data generated at the palette data generating step, into the original image based on the original image data; and an image displaying step for sequentially displaying the images obtained by the translucent synthesis.

According to yet another aspect of the present invention, there is provided an information recording medium for storing a program which, when executed by a computer, causes the computer to perform the steps of: obtaining original image data representing an original image; obtaining light-and-shade pattern data representing the light-and-shade pattern to be added to the original image and constructed by causing a palette number to correspond to each image region obtained by dividing the original image; generating a plurality of palette data each constructed by assigning color information to each palette number, said color information having different brightness from each other, the plurality of palette data being different from each other; and translucently blending, in sequence, a plurality of light-and-shade images each based on the light-and-shade pattern data and one of the generated palette data, into the original image based on the original image data.

In the present invention, original image data and light-and-shade pattern data are obtained. The light-and-shade pattern data represents the light-and-shade pattern to be added to the original image, and is constructed by causing correspondence between a palette number and each image region obtained by dividing the original image. Moreover, in the present invention, a plurality of palette data are generated. The plurality of palette data may be generated at once or sequentially generated at each image display. The plurality of palette data are different from each other and are constructed by causing correspondence between each palette number and color information with brightness difference. A plurality of light-and-shade images each based on one of the palette data and the light-and-shade pattern data are translucently blended, in sequence, into the original image, and displayed. Because of this, images with light-and-shade pattern added to the original image are displayed, and the light-and-shade pattern changes. In this case, the original image data, light-and-shade pattern data, and palette data in general require less data than the data used in the animation method mentioned above. Thus, changes in light-and-shade pattern in an image can easily be represented as a video without significantly increasing the necessary storage capacity.

DESCRIPTION OF THE PREFERRED EMBODIMENT

Figure 1:
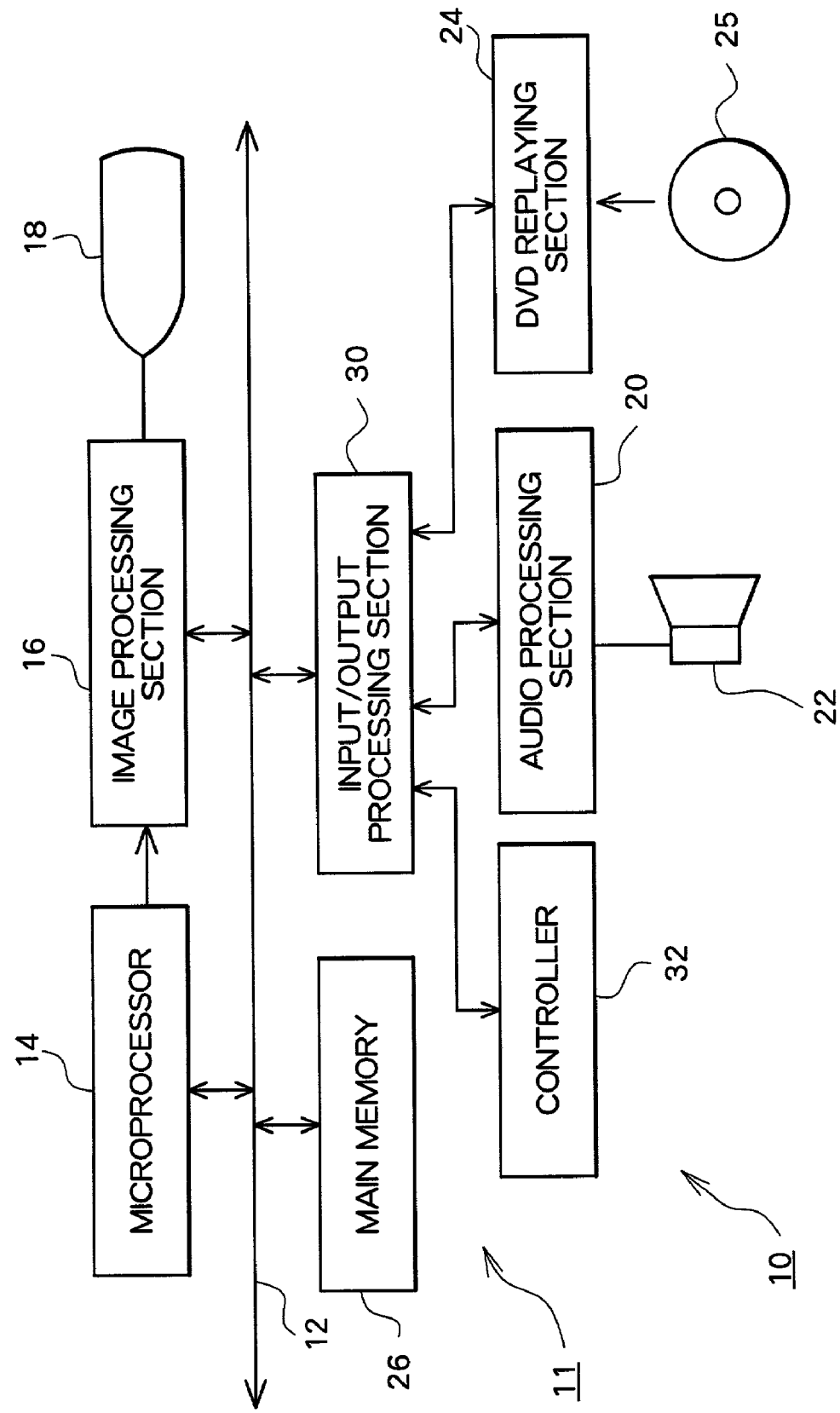
FIG. 1 is a diagram showing an overall structure of a game device (image processing device) according to a preferred embodiment of the present invention.

The entire disclosure of the corresponding Japanese application 2000-306610 filed on Oct. 5, 2000 including specification, claims, drawings and summary, is incorporated herein by reference.

The preferred embodiment of the present invention will now be described referring to the drawings.

FIG. 1 shows a structure of a game device according to a preferred embodiment of the present invention. A game device 10 shown in FIG. 1 is a preferred embodiment of the image processing device according to the present invention, and at the same time, is for embodying the image processing method according to the present invention. A DVD-ROM 25 shown in FIG. 1 is one preferred embodiment of the information recording medium according to the present invention. The game device 10 is constructed by connecting a monitor 18 and a speaker 22 to a consumer game machine 11 and attaching the DVD-ROM 25 which is the information recording medium. Here, the DVD-ROM 25 is used for supplying game program (which includes game data; it is assumed that the term "game program" includes game data hereinafter) to the consumer game machine 11. However, any other information recording medium can be used, such as, for example, a CD-ROM, a ROM card or the like. It is also possible to connect a modem or a terminal adapter and to supply the game program to the consumer game machine 11 from a remote location, via a communication network such as the Internet.

The consumer game machine 11 includes a microprocessor 14, an image processing section 16, a main memory 26, and an input/output processing section 30, connected to each other by a bus 12 so that data communication between these components is possible. A controller 32, an audio processing section 20, and a DVD reproduction section 24 are connected to the input/output processing section 30. Each of the components of the game machine 11 other than the controller 32 are stored in a housing. A consumer TV set, for example, is used as the monitor 18, and the internal speaker of the TV set is used as the speaker 22.

The microprocessor 14 controls each section of the consumer game machine 11 based on the operating system stored in a ROM (not shown) or based on a game program read out from the DVD-ROM 25. The bus 12 is provided for the communication of address and data between each section of the consumer game machine 11. The game program read out from the DVD-ROM 25 is written onto the main memory 26 as necessary. The image processing section 16 includes a VRAM. The image processing section 16 receives the image data transmitted from the microprocessor 14, draws the game screen on the VRAM, and, at the same time, converts the image data into a video signal and outputs to the monitor 18 at a predetermined timing.

The input/output processing section 30 is an interface for relaying data communication between the controller 32, audio processing section 20, and DVD-ROM reproduction section 24, and the microprocessor 14. The controller 32 is input means for allowing a player to manipulate the game. The input/output processing section 30 scans the manipulation condition of various buttons on the controller 32 at a predetermined interval (for example, every 1/60 second), and transmits manipulation signals representing the scan result to the microprocessor 14 via the bus 12. The microprocessor 14 judges the game manipulation by the player based on the manipulation signal. The audio processing section 20 includes a sound buffer, and replays data such as, for example, music and game sound effects read out from the DVD-ROM 25 and stored in the sound buffer, for output from the speaker 22. The DVD reproduction section 24 reads out the game program stored in the DVD-ROM 25 in response to instructions from the microprocessor 14.

A technique for displaying a national flag with light-and-shade pattern by the game device 10 having the above described structure will now be described. In this game device 10, a light-and-shade image is translucently blended into the original image shown in FIG. 2 (showing the national flag of Japan). The light-and-shade image is obtained by representing the light-and-shade pattern shown in FIG. 3 using the palette data shown in FIG. 4. In this manner, an image of the national flag of Japan with light-and-shade, as shown in FIG. 5 is displayed on the monitor 18.

Figure 2:
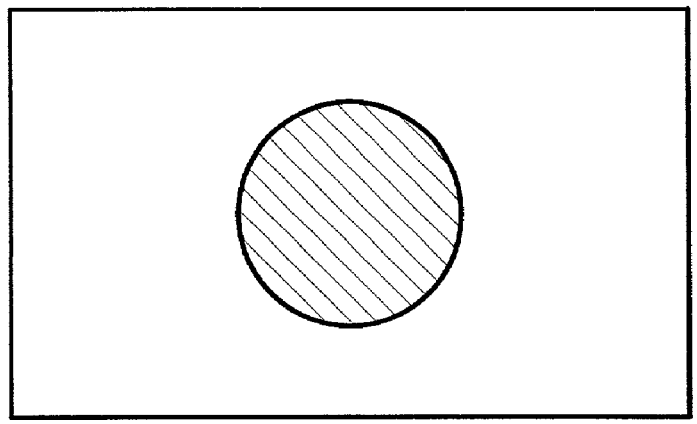
FIG. 2 is a diagram showing an example of an original image.

First, the original image shown in FIG. 2 can be displayed based on the original image data (including pattern and color data, and palette data), and the original image data is pre-stored in the DVD-ROM 25 and loaded to the main memory 26 by the microprocessor as necessary.

Figure 3:
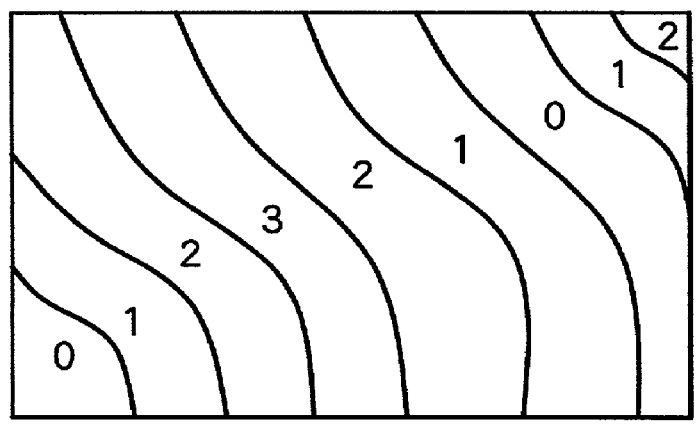
FIG. 3 is a diagram showing an example of light-and-shade pattern.

The light-and-shade pattern shown in FIG. 3 is a pattern represented by light-and-shade pattern data (pattern and color data), and has the same size as the original image. Nine substantially band-shaped image regions are assigned from the bottom left corner to the top right corner. Palette numbers are set so that the number is 0, 1, 2, 3, 2, 1, 0, 1, 2 from the bottom left to the top right, in that order. In other words, the light-and-shade pattern data is constructed by assigning a palette number to each of the image regions. Specifically, the palette numbers are assigned to each of the image regions so that the corresponding palette number is incremented by 1 from 0, from the bottom left corner of the image toward the top right corner until the palette number becomes 3, at which point the palette number starts to decrease by 1. When a palette number of 0 is reached again, the assigned palette number again starts to increase by 1. The light-and-shade pattern data is also pre-stored in the DVD-ROM 25, and is loaded to the main memory 26 by the microprocessor 14 as necessary.

Figure 4:
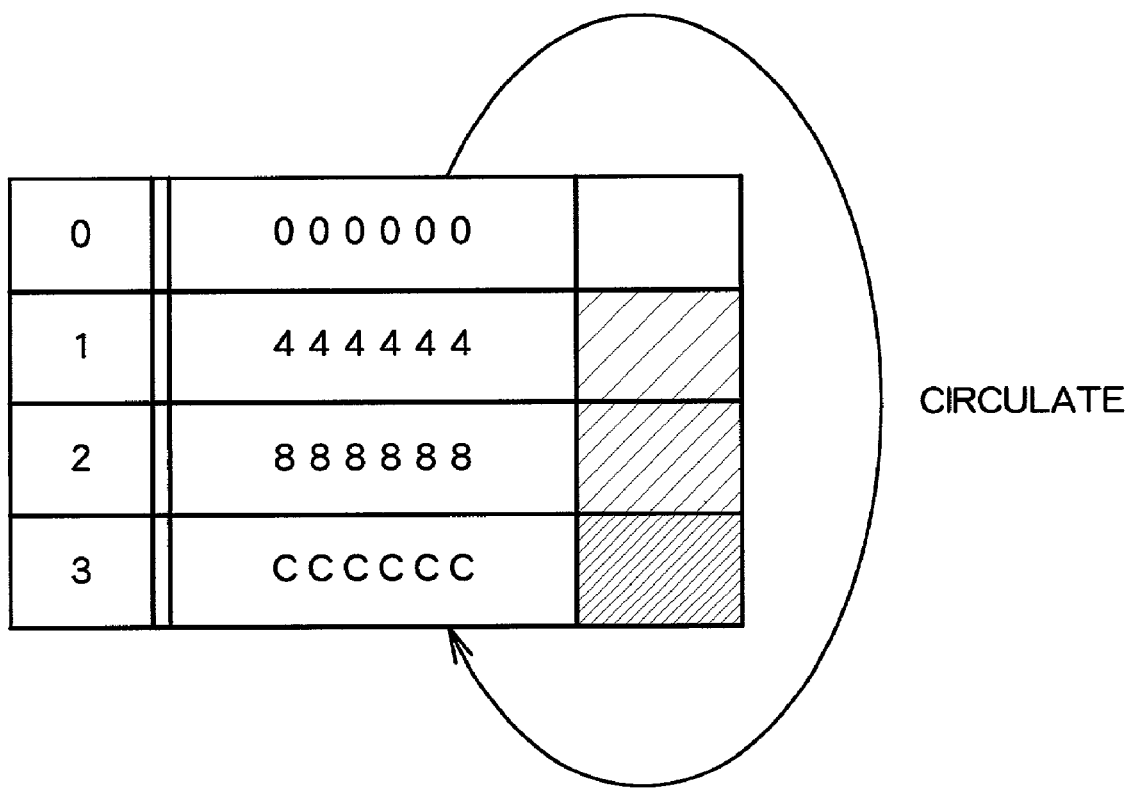
FIG. 4 is a diagram showing a structure of palette data.
Figure 5:
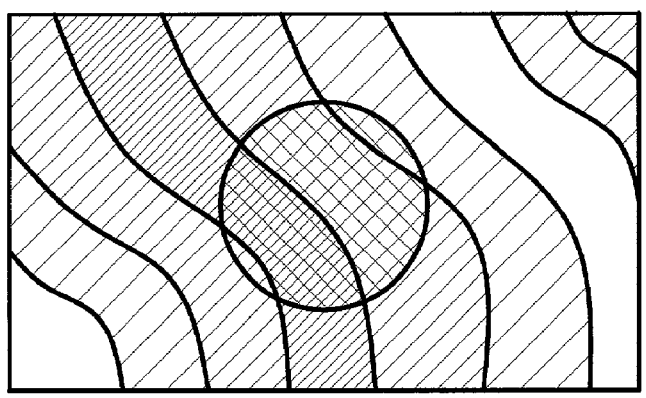
FIG. 5 is a diagram showing an example of an image with light-and-shade.

The palette data shown in FIG. 4 stores the palette number (0 to 3) and color information with one-to-one correspondence, and is used with the light-and-shade pattern data as described above as a pair. In the palette data shown in FIG. 4, color information of no-color and transparent is set to correspond to the palette number 0 and color information of gray and translucent are set to correspond to the palette numbers 1 through 3. Here, the color information is set so that the gray becomes more concentrated as the palette number is incremented from 1 toward 3. The palette data is also pre-stored in the DVD-ROM 25 and loaded to the main memory 26 by the microprocessor 14 as necessary.

FIG. 5 shows an image of the national flag of Japan with the light-and-shade, displayed on the monitor 18. This image is obtained by transferring the image of the national flag of Japan shown in FIG. 2 from the main memory 26 to the VRAM of the image processing section 16, and then translucently blending the light-and-shade pattern shown in FIG. 3 using the palette data shown in FIG. 4 into the image in the VRAM. As shown in FIG. 5, the image of the national flag of Japan with the light-and-shade shows a point in time where a light-and-shade pattern is generated by a gradual change in brightness from the bottom left corner to the top right corner, compared to the image of the national flag of Japan shown in FIG. 2.

In the game device 10, after the image of the national flag of Japan with the light-and-shade is displayed, the palette data shown in FIG. 4 is modified, and the light-and-shade pattern shown in FIG. 3 is translucently blended into the image of the national flag of Japan shown in FIG. 2 using the modified palette data, and the blended image is then displayed. As a result of such a modification to the palette data, the correspondence of the palette number and the color information is shifted from the original configuration by 1. In other words, palette number 1 is set to color information of non-color and transparent, and palette numbers 2, 3, and 0 are set to color information of gray and translucent, the gray color becoming more concentrated in that order. Moreover, after the image is displayed using the modified palette data, the palette data is further modified so that palette number 2 is set to color information of non-color and transparent, and palette numbers 3, 0, and 1 are set to color information of gray and translucent, the gray color becoming more concentrated in that order. Similarly, after each image display using the modified palette data, the correspondence between the palette number and color information are shifted by 1 compared to the previous condition. After three such modifications to the palette data, the original palette data (FIG. 4) is used again. By sequentially changing the palette data and translucently blending the light-and-shade pattern using such palette data onto the national flag of Japan as shown in FIG. 2, the national flag of Japan can be represented as the high brightness section and the low brightness section moving from the bottom left corner of the image to the top right corner. In this manner, the national flag of Japan waving in wind can be preferably represented as video.

Figure 6:
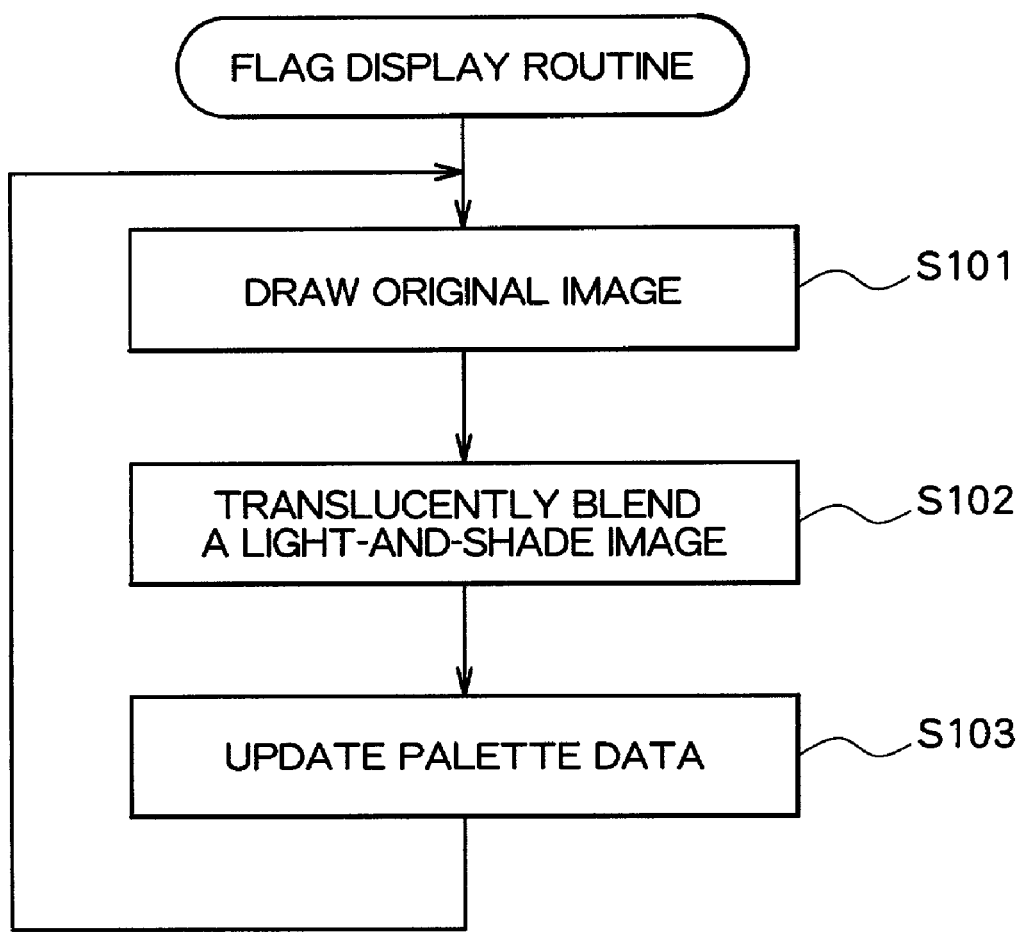
FIG. 6 is a flowchart for explaining the image processing for displaying an image with light-and-shade.

FIG. 6 shows a flowchart for explaining the program to execute the above described image processing. The program shown in FIG. 6 is stored in the DVD-ROM 25, loaded to the main memory 26 as necessary, and executed by the microprocessor 14. Tn this process, the original image data which represents the national flag of Japan as shown in FIG. 2 is loaded from the DVD-ROM 25 to the main memory 26 and transferred to the VRAM of the image processing section 16. In this manner, the original image is written to VRAM (frame memory) (step S101). Then, the light-and-shade pattern data representing the light-and-shade pattern of FIG. 3 and the palette data of FIG. 4 are loaded from the DVD-ROM 25 to the main memory 26. A light-and-shade image based on the palette data and the light-and-shade pattern data is translucently blended into the image of the national flag of Japan already drawn on the VRAM (step S102). In this manner, an image of the national flag of Japan with the light-and-shade drawn on the VRAM is output to and displayed on the monitor 18 at a predetermined timing. Then, the microprocessor updates (modifies) the palette data loaded to the main memory 26 so that the correspondence between the palette number and the color information are shifted by 1, as described above (step S103). The modified palette data is used when the light-and-shade image is again translucently blended to the original image (step S102). In this manner, the national flag of Japan waving in wind can be represented as a video.

As described, in the game device 10, the national flag of Japan waving in wind can be represented in an image by making data of the original image of the national flag of Japan (without light-and-shade pattern) shown in FIG. 2 and of the light-and-shade pattern shown in FIG. 3, preparing palette data shown in FIG. 4, and storing these data in the DVD-ROM 25. In other words, in a desired image, the changes in light-and-shade pattern can be represented by a lower storage capacity and requires less preparation compared to the prior art.

The present invention is not limited to the above mentioned embodiment.

For example, in the above explanation, a light-and-shade pattern is added to an image of a flag. However, it is possible to apply the present invention to any desired image to add a light-and-shade pattern. For example, an image of a wave generated on a water surface, or the like, can be represented in an image.

What is claimed is:

1. An image processing device comprising:
original image data obtaining means for obtaining original image data representing an onginal image;
light-and-shade pattern data obtaining means for obtaining light-and-shade pattern data representing the light-and-shade pattern to be added to said original image and constructed by assigning a palette number to each image region obtained by dividing said original image;
palette data generating means for generating a plurality of palette data each constructed by assigning color information to each palette number, said color information having different brightness from each other, said plurality of palette data being different from each other;
translucent blending means for translucently blending, in sequence, a plurality of light-and-shade images each based on said light-and-shade pattern data and one of the palette data generated by said palette data generating means, into said original image based on said original image data; and
image displaying means for sequentially displaying images obtained by the translucent synthesis.

2. The image processing device of claim 1, wherein said original image is divided into successive bands and said image displaying means generates an image representing movement across at least a part of the original image.

3. The image processing device of claim 1 where said translucent blending means is operative to sequentially circulate said palette numbers successively among said regions.

4. An image processing method, comprising:
an original image data obtaining step for obtaining original image data representing an original image;
a light-and-shade pattern data obtaining step for obtaining light-and-shade pattern data representing the light-and-shade pattern to be added to said original image and constructed by assigning palette number to each image region obtained by dividing said original image;
a palette data generating step for generating a plurality of palette data each constructed by assigning color information to each palette number, said color information having different brightness from each other, said plurality of palette data being different from each other;
a translucent blending step for translucently blending, in sequence, a plurality of light-and-shade images each based on said light-and-shade pattern data and one of the palette data generated at said palette data generating step, into said original image based on said original image data; and
an image displaying step for sequentially displaying the images obtained by the translucent synthesis.

5. The image processing method of claim 4, where said translucent blending step comprises sequentially circulating said palette numbers successively among said regions.

6. The image processing method of claim 4, wherein said original image is divided into successive bands and said image displaying step further comprises generating an image representing movement across at least a part of the original image.

7. An information recording medium for storing a program which, when executed by a computer, causes the computer to perform:
> an original image data obtaining step for obtaining original image data representing an original image;
> a light-and-shade pattern data obtaining step for obtaining light-and-shade pattern data representing the light-and-shade pattern to be added to said original image and constructed, by assigning a palette number to each image region obtained by dividing said original image;
> a palette data generating step for generating a plurality of palette data each constructed by assigning color information to each palette number, said color information having different brightness from each other, said plurality of palette data being different from each other; and
> a translucent blending step for translucently blending, in sequence, a plurality of light-and-shade images each based on said light-and-shade pattern data and one of the palette data generated at said palette data generating step, into said original image based on said original image data.

8. The information processing medium of claim 7, wherein said original image is divided into successive bands and said image displaying step further comprises generating an image representing movement across at least a part of the original image.

9. The information recording medium of claim 7 where said translucent blending step comprises sequentially circulating said palette numbers successively among said regions.

10. An image processing device comprising:
> a first unit operative to obtain original image data representing an original image;
> a second unit operative to obtain light-and-shade pattern data representing the light-and-shade pattern to be added to said original image and constructed by assigning palette number to each image region obtained by dividing said original image;
> a third unit operative to generate a plurality of palette data each constructed by assigning color information to each palette number, said color information having different brightness from each other, said plurality of palette data being different from each other; and
> a fourth unit operative to translucently blend, in sequence, a plurality of light-and-shade images each based on said light-and-shade pattern data and one of the palette data generated at said palette data generating step, into said original image based on said original image data.

11. The image processing device of claim 10, wherein said original image is divided into successive bands and said image displaying means generates an image representing movement across at least a part of the original image.

12. The image processing device of claim 10, where said fourth unit is operative to sequentially circulate said palette numbers successively among said regions.

* * * * *